United States Patent
Imaoka

(10) Patent No.: US 10,663,840 B2
(45) Date of Patent: May 26, 2020

(54) PROJECTION-TYPE DISPLAY DEVICE

(71) Applicant: Konica Minolta, Inc., Tokyo (JP)

(72) Inventor: Masayuki Imaoka, Izumiotsu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/322,774

(22) PCT Filed: Jul. 26, 2017

(86) PCT No.: PCT/JP2017/027089
§ 371 (c)(1),
(2) Date: Feb. 1, 2019

(87) PCT Pub. No.: WO2018/030157
PCT Pub. Date: Feb. 15, 2018

(65) Prior Publication Data
US 2019/0196305 A1 Jun. 27, 2019

(30) Foreign Application Priority Data

Aug. 10, 2016 (JP) ................................ 2016-157673

(51) Int. Cl.
*G03B 21/00* (2006.01)
*G02B 13/16* (2006.01)
(Continued)

(52) U.S. Cl.
CPC ............ *G03B 21/008* (2013.01); *G02B 5/04* (2013.01); *G02B 5/08* (2013.01); *G02B 13/16* (2013.01);
(Continued)

(58) Field of Classification Search
CPC ...... G03B 21/008; G03B 21/00; G03B 21/14; G03B 21/56; G03B 21/2066; H04N 9/317;
(Continued)

(56) References Cited

U.S. PATENT DOCUMENTS

2003/0071976 A1* 4/2003 Okuyama ............ G03B 21/006 353/31
2007/0211343 A1* 9/2007 Clark ....................... G02B 5/04 359/577

FOREIGN PATENT DOCUMENTS

JP 201337044 A 2/2013

OTHER PUBLICATIONS

International Search Report dated Oct. 24, 2017 filed in PCT/JP2017/027089.

* cited by examiner

*Primary Examiner* — Isiaka O Akanbi
*Assistant Examiner* — Danell L Owens
(74) *Attorney, Agent, or Firm* — Rankin, Hill & Clark LLP

(57) ABSTRACT

A projection-type display device, provided with: a reflection-type image display element (DP), in which illumination light is reflected at an image display surface so as to be converted to image light and emitted; a prism unit (PU1) that bends a light path of the illumination light and transmits image light; and a projection lens system (PO) that projects the image light transmitted through the prism unit onto a screen. The prism unit (PU1) has an air gap (AG) that is disposed obliquely with respect to the main light rays of the image light emitted from the center of the image display surface. At least one lens (DL) in the projection lens system (PO) is eccentric in relation to the optical axis of the projection lens system (PO) so that comatic aberration produced when the image light is transmitted through the air gap (AG) will be canceled out.

6 Claims, 13 Drawing Sheets

(51) Int. Cl.
    *G03B 21/14* (2006.01)
    *H04N 9/31* (2006.01)
    *G02B 5/04* (2006.01)
    *G02B 5/08* (2006.01)
    *G03B 21/20* (2006.01)
    *G03B 21/56* (2006.01)

(52) U.S. Cl.
    CPC ............. *G03B 21/00* (2013.01); *G03B 21/14* (2013.01); *G03B 21/2066* (2013.01); *G03B 21/56* (2013.01); *H04N 9/31* (2013.01); *H04N 9/317* (2013.01)

(58) Field of Classification Search
    CPC ... H04N 9/31; G02B 5/08; G02B 5/04; G02B 13/16
    See application file for complete search history.

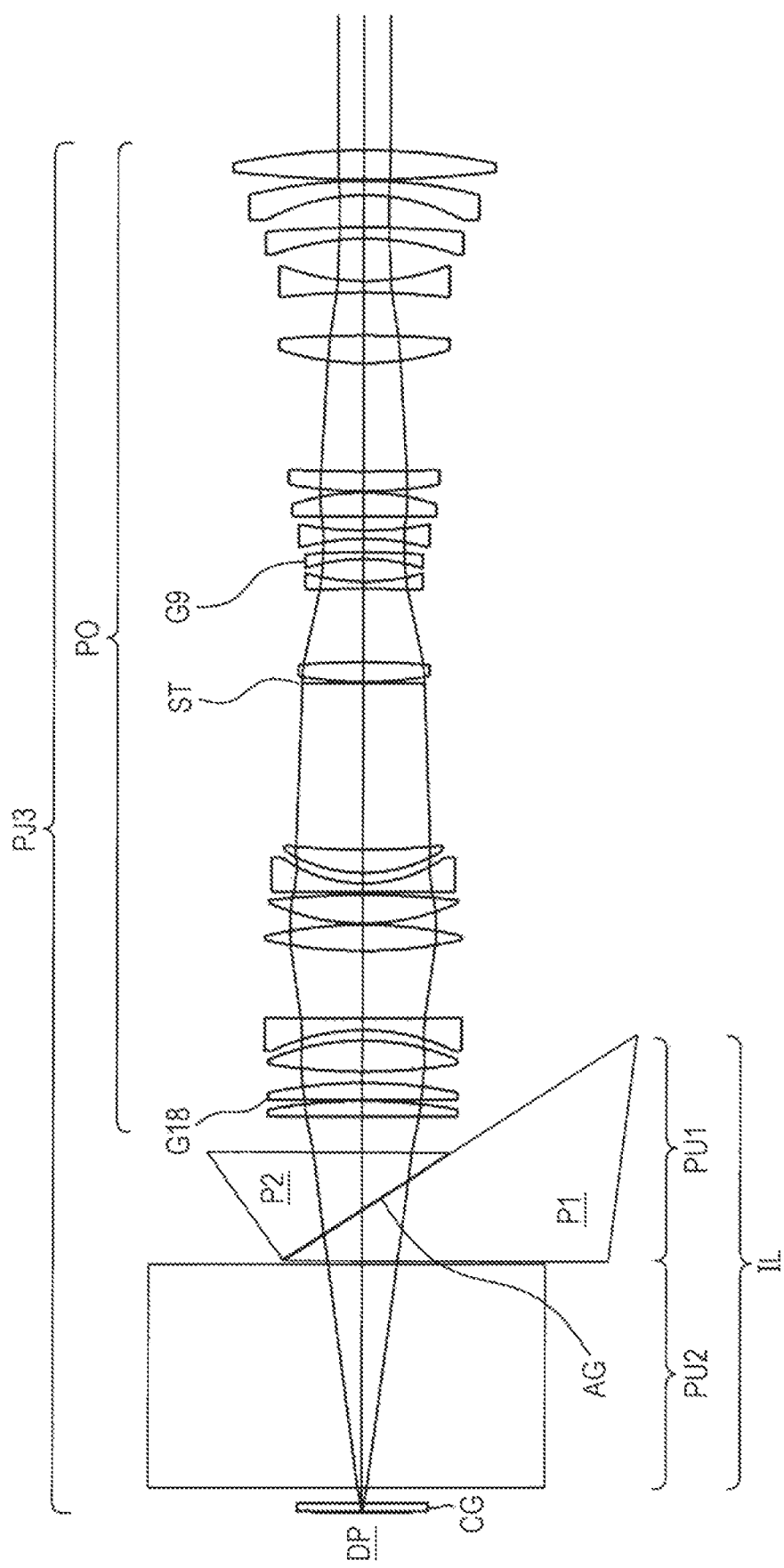

NO ECCENTRICITY IS APPLIED

G18,-0.8mm

G18,−0.2deg

G9,−0.1deg

NO ECCENTRICITY IS APPLIED

NO ECCENTRICITY IS APPLIED

G18,-0.8mm

G18,-0.8mm

PROJECTION-TYPE DISPLAY DEVICE

TECHNICAL FIELD

The present invention relates to a projection-type display device and relates to a projection-type display device provided with a reflection-type image display element such as a digital micromirror device.

BACKGROUND ART

In a projector of the digital light processing (DLP; US registered trademark of Texas Instruments Incorporated) method, a image is cast using an optical semiconductor called a DLP chip containing millions of small mirrors (micromirrors). In the case of a three-chip-type DLP method using three DLP chips, lamp light is decomposed into three primary colors of light (RGB) with a special prism, and each DLP chip is illuminated to display a color image. Meanwhile, in the case of a one-chip-type DLP method using one DLP chip, lamp light is decomposed into three primary colors of light (RGB) with one color wheel color-coded into three colors of RGB, and one DLP chip is illuminated to display a color image. Since the color wheel rotates at high speed and a micromirror is switched ON/OFF at high speed according to the rotation, the human eye sees the displayed image as a color image in which RGB is synthesized by the afterimage effect.

The digital micromirror device typified by the above-described DLP chip is common as a reflection-type image display element for a projector. The digital micromirror device has an image display surface made up of a plurality of minute micromirrors and controls the tilt of each mirror surface on the image display surface so as to modulate the intensity of illumination light, so that an image is formed. In other words, turning ON/OFF of each pixel of the digital micromirror device is implemented, for example, by revolving a mirror surface by ±12° around a rotation axis forming an angle of 45° with respect to each side of the image display surface (that is, the micromirror is driven with regard to one axis). Concerning the action of the micromirror, a digital micromirror device of a new operation type (tilt & roll pixel digital micromirror device (DMD)) that drives a micromirror with regard to two orthogonal axes is also known.

Various types of projection-type display devices have been proposed in the past as a projector equipped with a reflection-type image display element such as the above-mentioned digital micromirror device (see, for example, Patent Literature 1) and a bright high-definition projector is further required.

CITATION LIST

Patent Literature

Patent Literature 1: JP 2013-37044 A

SUMMARY OF INVENTION

Technical Problem

While a high-definition projector is required as described above, in a conventional projection-type display device using a reflection-type image display element, an air gap for guiding illumination light to the image display element by total reflection causes image deterioration (flare due to comatic aberration) in transmitted image light. For this reason, there is a limit to high definition with the current state.

For example, in the projection-type display device described in Patent Literature 1, in order to correct astigmatism produced in an inclined dichroic filter, an optical element asymmetrical with respect to the optical axis of a lens unit (e.g., an inclined wedge plate or a free curved surface lens) are added to a lens system. These optical elements are optimally designed in advance for astigmatism correction. Therefore, it is difficult to add these optical elements to the existing original lens system later as a correction means. Furthermore, in the case of Patent Literature 1, since there is no air gap in the device, comatic aberration attributable to the air gap is not mentioned.

The present invention has been made in view of such circumstances, and an object thereof is to provide a projection-type display device with improved image quality by reducing flare due to comatic aberration produced in a prism unit.

Solution to Problem

In order to attain the above object, the projection-type display device of the present invention includes: a reflection-type image display element, in which illumination light is reflected at an image display surface so as to be converted to image light and emitted; a prism unit that bends a light path of the illumination light and transmits image light; and a projection lens system that projects the image light transmitted through the prism unit onto a screen, in which the prism unit has an air gap that is disposed obliquely with respect to a main light ray of the image light emitted from a center of the image display surface, and at least one lens in the projection lens system is eccentric in relation to an optical axis of the projection lens system so that comatic aberration produced when the image light is transmitted through the air gap will be canceled out.

Advantageous Effects of Invention

According to the present invention, flare due to comatic aberration produced in a prism unit can be reduced to improve image quality, and as a result, it is possible to realize a bright high-definition projection-type display device.

BRIEF DESCRIPTION OF DRAWINGS

FIG. 9 is a light path diagram illustrating examples of the projection-type display device corresponding to the third embodiment.

DESCRIPTION OF EMBODIMENTS

Figure 1:
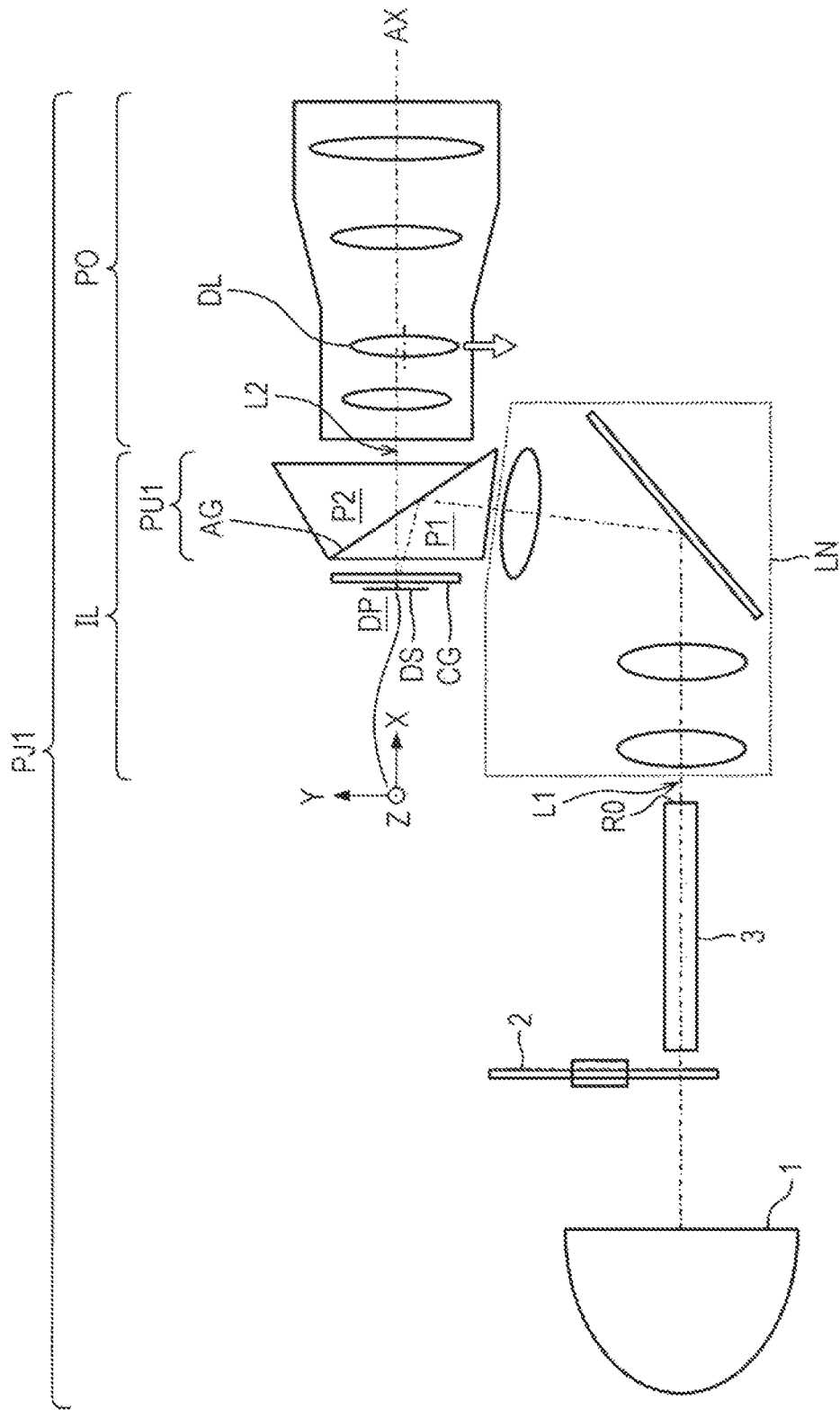
FIG. 1 is a schematic configuration diagram illustrating a first embodiment of a projection-type display device.

Hereinafter, embodiments and the like of a projection-type display device according to the present invention will be described with reference to the drawings. Note that the same reference numerals are given to the same parts and corresponding parts mutually between the embodiments and the like, and redundant explanation will be appropriately omitted.

Figure 2:
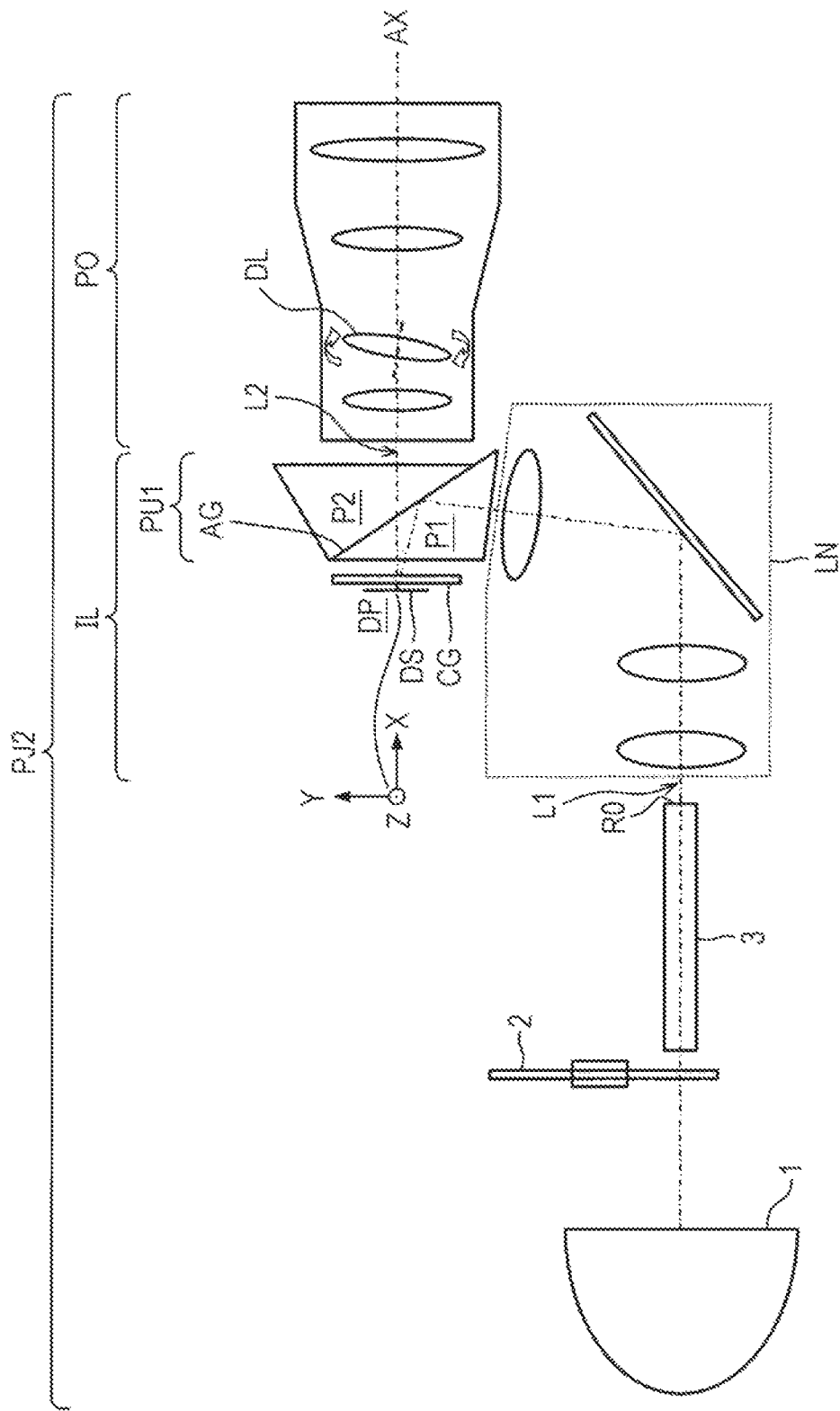
FIG. 2 is a schematic configuration diagram illustrating a second embodiment of the projection-type display device.
Figure 3:
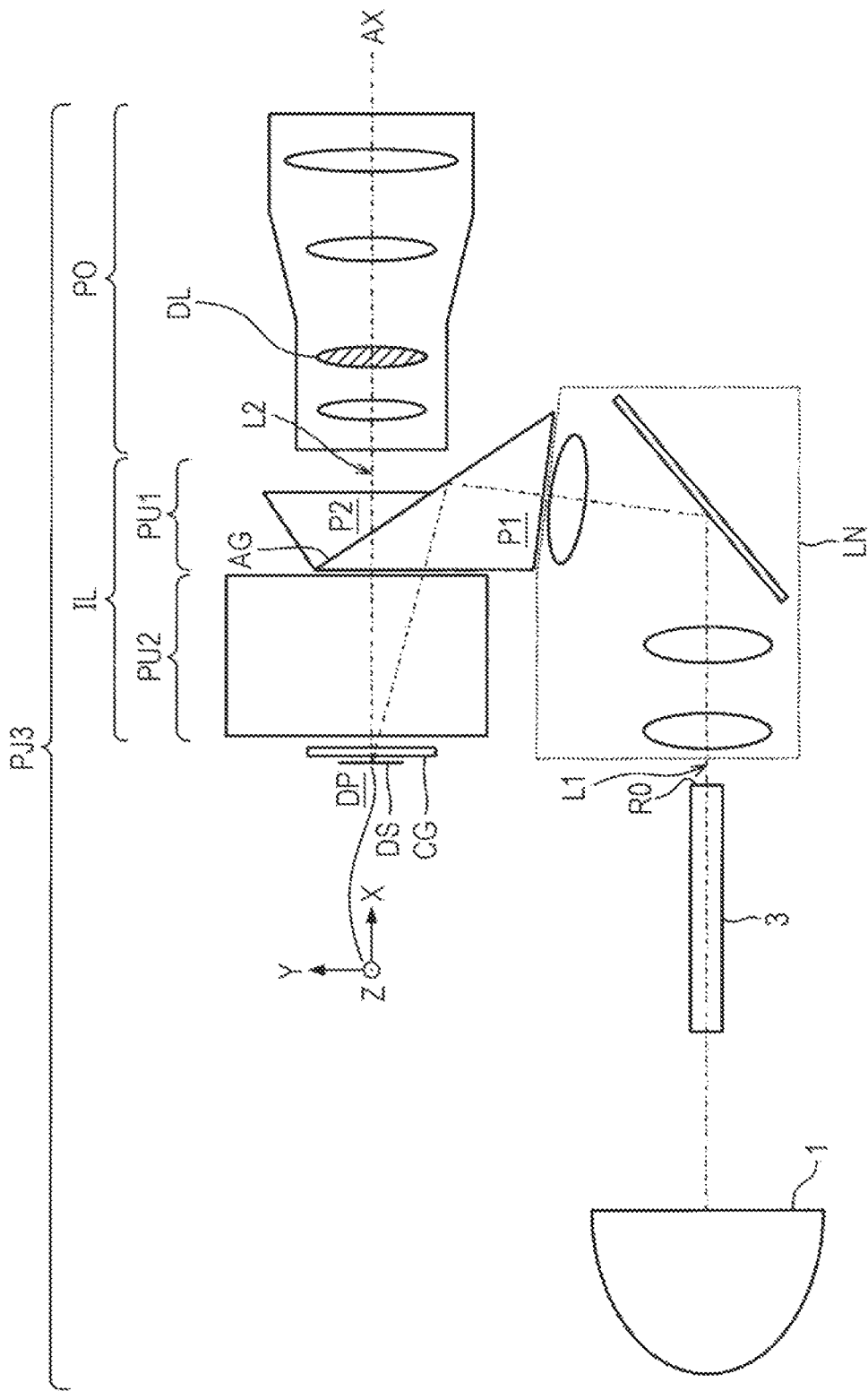
FIG. 3 is a schematic configuration diagram illustrating a third embodiment of the projection-type display device.
Figure 4:
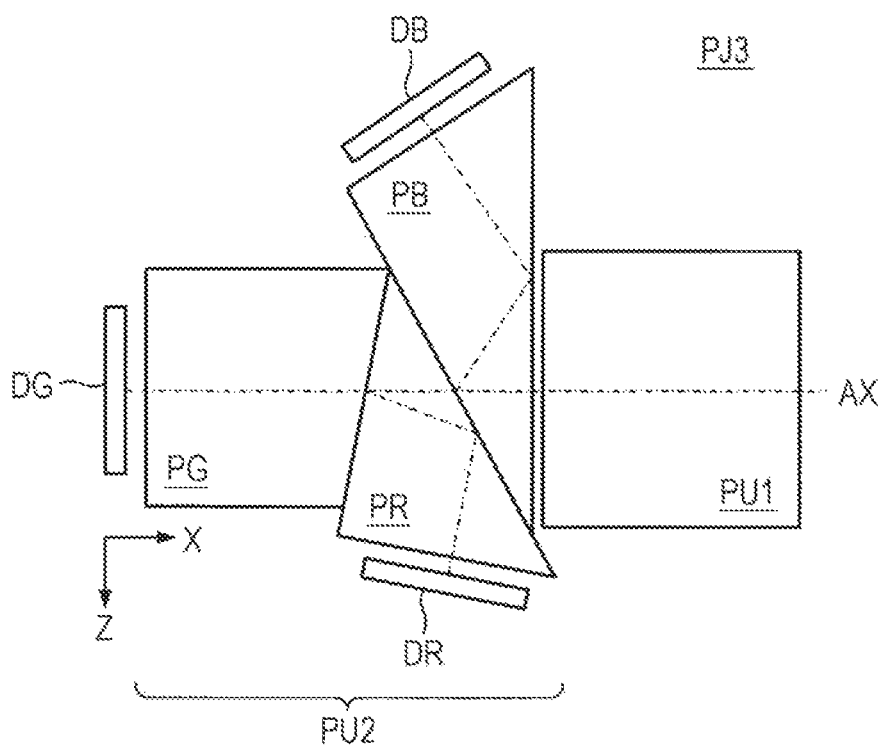
FIG. 4 is a top view illustrating an example of a principal part of the third embodiment.
Figure 5:
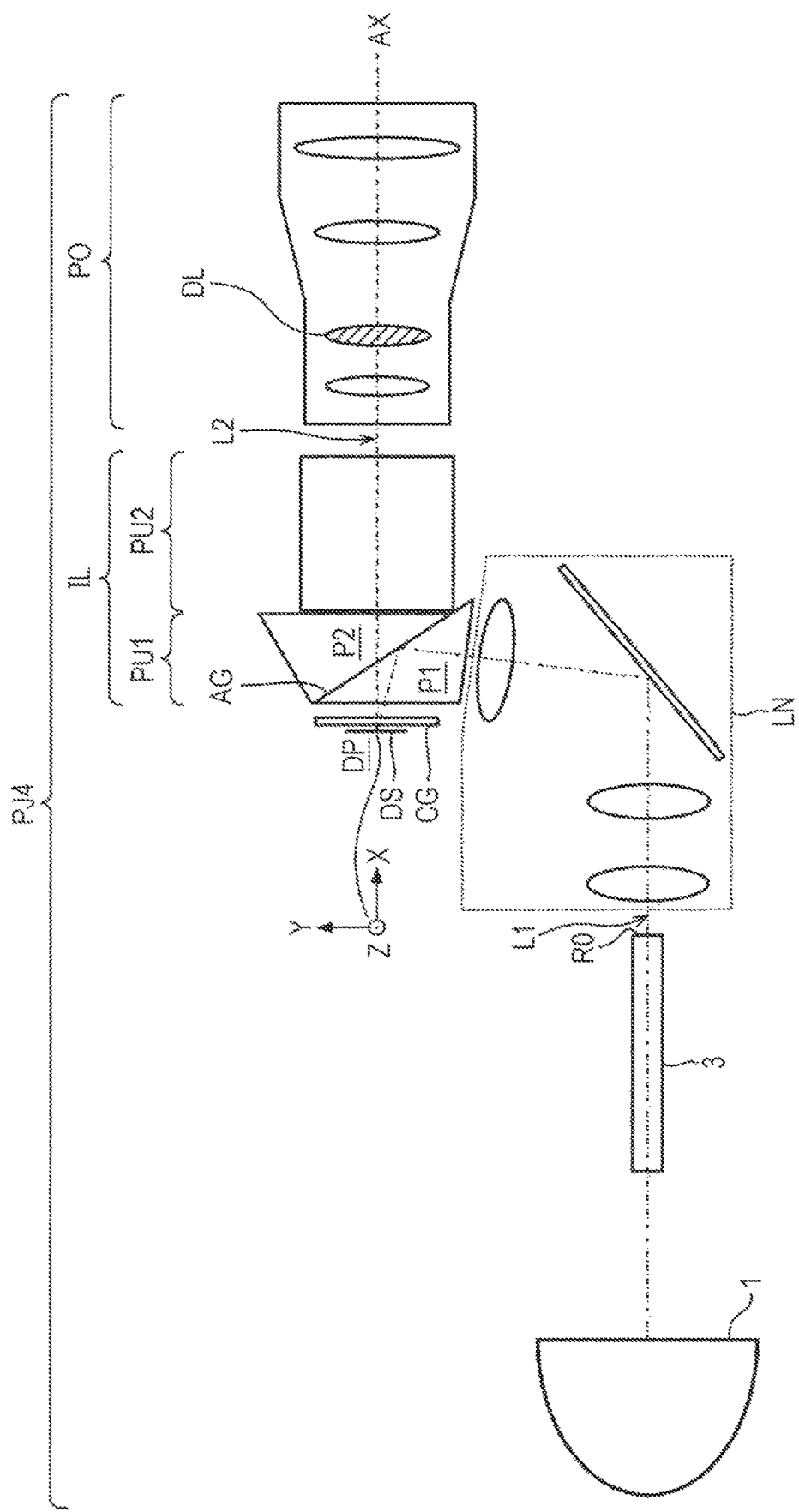
FIG. 5 is a schematic configuration diagram illustrating a fourth embodiment of the projection-type display device.
Figure 6:
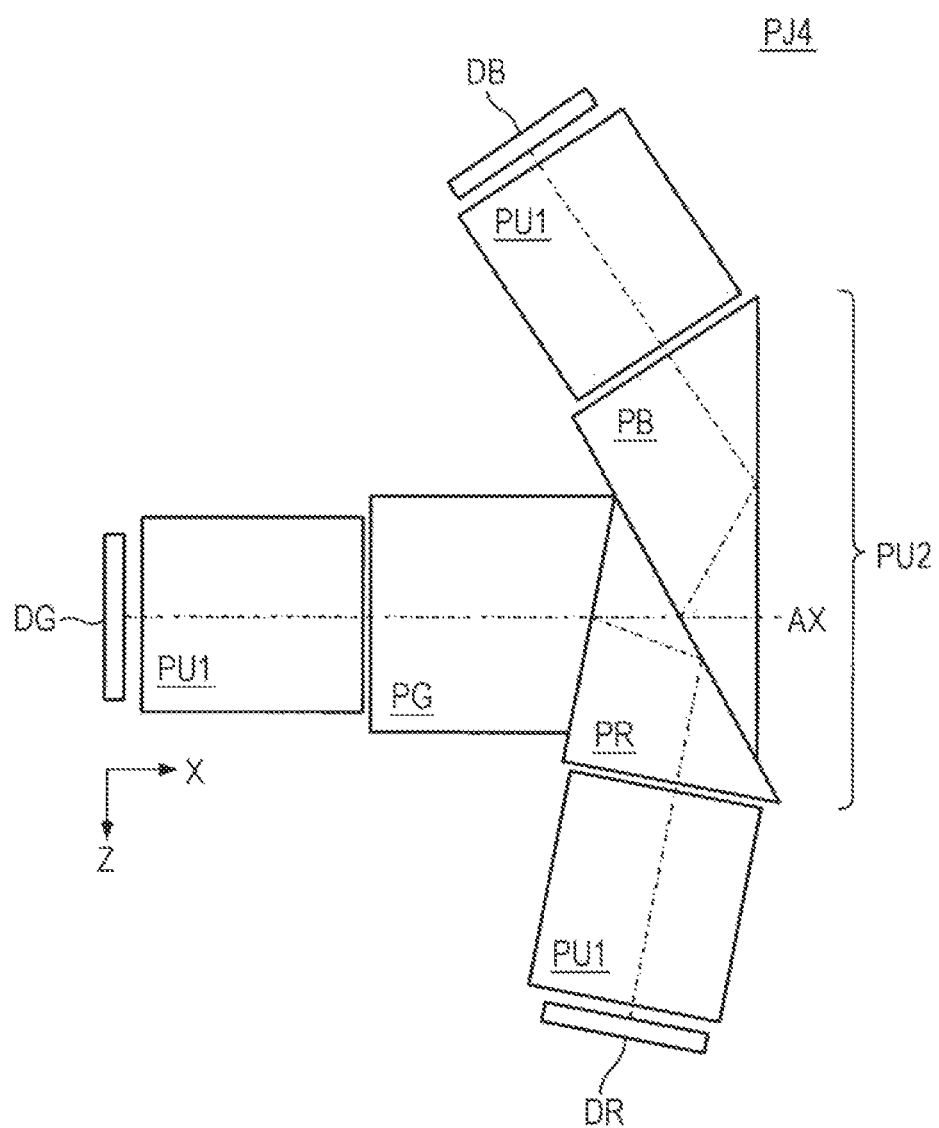
FIG. 6 is a top view illustrating an example of a principal part of the fourth embodiment.

FIGS. 1 and 2 illustrate projectors PJ1 and PJ2 of one chip type as first and second embodiments of the projection-type display device, respectively. FIG. 3 illustrates a projector PJ3 of a three-chip type as a third embodiment of the projection-type display device, and an example of a principal part thereof is illustrated in FIG. 4. FIG. 5 illustrates a projector PJ4 of a three-chip type as a fourth embodiment of the projection-type display device, and an example of a principal part thereof is illustrated in FIG. 6.

In FIGS. 1, 2, 3, and 5, a global orthogonal coordinate system is expressed as an absolute coordinate system that matches a local orthogonal coordinate system (X, Y, Z) whose origin is the center of an image display surface DS of a digital micromirror device DP, where the X direction is a direction parallel to a surface normal of the image display surface DS, the Z direction is a direction parallel to a tilt rotation axis of an air gap AG, and the Y direction is a direction orthogonal to the X direction and the Z direction. Therefore, the paper surface of FIGS. 1, 2, 3, and 5 corresponds to the XY plane, and the paper surface of FIGS. 4 and 6 corresponds to the XZ plane.

The one-chip-type projectors PJ1 and PJ2 (FIGS. 1 and 2) each has a structure provided with a light source device 1, a color wheel 2, an integral rod 3, an illumination optical system IL, a projection lens system PO, a digital micromirror device DP, and the like. Meanwhile, the three-chip-type projectors PJ3 and PJ4 (FIGS. 3 and 5) each has a structure provided with a light source device 1, an integral rod 3, an illumination optical system IL, a projection lens system PO, a digital micromirror device DP, and the like.

Examples of the light source device 1 for producing illumination light L1 in the projectors PJ1, PJ2, PJ3 and PJ4 include a xenon lamp and a laser light source. The light source device 1 used in the projectors PJ1, PJ2, and PJ3 is a white light source, while the light source device 1 used in the projector PJ4 is a color light source for producing color light of three respective wavelength bands: red (R), green (G), and blue (B).

The light source device 1 is configured in such a manner that a light radiating point is arranged at the focal position on a reflecting surface of a lamp reflector configured from an ellipsoidal surface, and convergent light emitted from the light source device 1 is caused to enter the integral rod 3 (FIGS. 3 and 5) or the color wheel 2 (FIGS. 1 and 2). In other words, the projectors PJ3 and PJ4 are configured to cause convergent light to enter the integral rod 3, and the projectors PJ1 and PJ2 are configured to cause convergent light to enter the color wheel 2 so that light flux having passed through the color wheel 2 enters the integral rod 3.

The color wheel 2 equipped in the projectors PJ1 and PJ2 is made up of three kinds of color filters which transmit color light of R, G and B. By rotating the color wheel 2, the color light to be illuminated is switched sequentially in time, and image information corresponding to each color is displayed on the digital micromirror device DP, so that a cast image can be colorized.

The integral rod 3 supposed here is a light intensity equalizing element of a hollow rod method constituted by bonding four plane mirrors. The illumination light L1 entering from an entrance side end face (rod entrance face) of the integral rod 3 is mixed by being repetitively reflected at side surfaces (that is, inner wall surfaces) of the integral rod 3 many times, and the spatial energy distribution of the illumination light L1 is equalized then the illumination light L1 is emitted from an exit side end face (rod exit face) R0.

The shape of the exit side end face R0 of the integral rod 3 is a quadrangle (may be a rectangle or a trapezoid) which is substantially similar to the image display surface DS of the digital micromirror device DP and additionally, the exit side end face R0 of the integral rod 3 is conjugate or substantially conjugate with respect to the image display surface DS of the digital micromirror device DP. Therefore, the luminance distribution at the exit side end face R0 is equalized by the mixing effect described above, so that the digital micromirror device DP is efficiently and equally illuminated.

Note that the integral rod 3 is not limited to a hollow rod but may be a glass rod constituted by a quadrangular prism-shaped glass body. Furthermore, as long as the compatibility with the shape of the image display surface DS of the digital micromirror device DP is kept, its side surfaces are not limited to four surfaces. That is, the cross-sectional shape is not limited to a quadrilateral such as a rectangle or a trapezoid. Therefore, as the integral rod 3 to be used, a hollow cylinder constituted by combining a plurality of reflecting mirrors, a glass body having a polygonal prism shape, and the like can be mentioned.

The illumination light L1 emitted from the exit side end face R0 of the integral rod 3 enters the illumination optical system IL. The illumination optical system IL is a catadioptric optical system that guides the entering illumination light L1 to the digital micromirror device DP to illuminate the image display surface DS thereof. Then, there are provided a condenser lens system LN (made up of a lens, a plane mirror, and the like) that condenses the illumination light L1, and a first prism unit PU1 or first and second prism units PU1 and PU2 as a prism unit for bending the light path of the illumination light L1 and transmitting image light L2, to make the exit side end face R0 of the integral rod 3 and the image display surface DS conjugate or substantially conjugate. Note that the light paths in FIGS. 1 to 6 indicate a central main light ray of the illumination light L1 and the image light L2 (corresponding to an optical axis AX, which is the main light ray of the image light L2 emitted from the center of the image display surface DS and goes through the center of the image display surface DS).

The illumination light L1 that has entered the illumination optical system IL is condensed by the condenser lens system LN and then enters the first prism unit PU1. The first prism unit PU1 is constituted by a total internal reflection (TIR) prism configured from two substantially triangular prism-shaped prisms P1 and P2, and the air gap AG is provided between the prisms P1 and P2. The air gap AG is disposed obliquely by a predetermined angle (90°-G) with respect to the central main light ray L2p (FIG. 7) of the image light L2 emitted from the center of the image display surface DS as will be described later (G: an angle of the air gap AG with respect to a plane perpendicular to the main light ray L2p (optical axis AX) of the image light L2 emitted from the center of the image display surface DS (FIG. 7)), and separates the light path into the illumination light (input light) L1 for the digital micromirror device DP and the image light (output light) L2.

In the projectors PJ1 and PJ2, the first prism unit PU1 bends the light path of the illumination light L1 and causes the illumination light L1 to enter the digital micromirror device DP. The light path is bent in such a manner that the illumination light L1 is incident on a slope of the prism P1 forming the air gap AG at an angle that satisfies the total reflection condition and is totally reflected. The image light L2 that has been reflected at the digital micromirror device DP and entered the first prism unit PU1 is transmitted through the air gap AG to emit from the first prism unit PU1 and enters the projection lens system PO to be projected onto a screen.

In the projector PJ3, the first prism unit PU1 bends the light path of the illumination light L1 including the RGB wavelength bands, and makes the illumination light L1 to enter the second prism unit PU2. The light path is bent in such a manner that the illumination light L1 is incident on a slope of the prism P1 forming the air gap AG at an angle that satisfies the total reflection condition and is totally reflected.

The second prism unit PU2 equipped in the projector PJ3 is constituted by color prisms for color separation and synthesis configured from three prisms PR, PG, and PB. For example, as illustrated in FIG. 4, the illumination light L1 emitted from the first prism unit PU1 is separated into the RGB wavelength bands and caused to enter three respective digital micromirror devices DR, DG, and DB; beams of the image light L2 emitted from the respective digital micromirror devices DR, DG, and DB are synthesized and caused to enter the first prism unit PU1. Then, the image light L2 that has entered the first prism unit PU1 is transmitted through the air gap AG to emit from the first prism unit PU1, and enters the projection lens system PO to be projected onto a screen.

The color separation and synthesis in the second prism unit PU2 will be described in more detail. FIG. 4 illustrates the first and second prism units PU1 and PU2 in a state viewed from a top side along the Y direction (FIG. 3). As illustrated in FIG. 4, the second prism unit PU2 has a structure in which substantially triangular prism-shaped blue prism PB and red prism PR, and a block-shaped green prism PG are sequentially combined. In addition, as a digital micromirror device DP (FIG. 3) for modulating the illumination light L1 on the image display surface DS according to an image signal, a digital micromirror device DR for red, a digital micro mirror device DG for green, and a digital micromirror device DB for blue are provided.

Between the blue prism PB and the red prism PR, a blue dichroic surface that reflects blue light and an air gap layer adjacent to the blue dichroic surface are provided. The air gap layer is inclined with respect to the optical axis AX. Between the red prism PR and the green prism PG, a red dichroic surface that reflects red light and an air gap layer adjacent to the red dichroic surface are provided. This air gap layer is also inclined with respect to the optical axis AX. The inclination direction thereof is opposite to the tilt direction of the air gap layer by the blue prism B and the red prism PR.

In the illumination light L1 that has entered from an entrance/emission surface of the blue prism PB, blue light is reflected at the blue dichroic surface and the other green light and red light are transmitted therethrough. The blue light reflected at the blue dichroic surface is totally reflected by the entrance/emission surface of the blue prism PB and is emitted from a blue entrance/emission surface which is a surface on the side of the blue prism PB, to illuminate the digital micromirror device DB for blue. Among the green light and the red light transmitted through the blue dichroic surface, the red light is reflected at the red dichroic surface and the green light is transmitted therethrough. The red light reflected at the red dichroic surface is totally reflected by the air gap layer provided adjacent to the blue dichroic surface and is emitted from a red entrance/emission surface which is a surface on the side of the red prism PR, to illuminate the digital micromirror device DR for red. The green light transmitted through the red dichroic surface is emitted from a green entrance/emission surface which is a surface on the side of the green prism PG to illuminate the digital micromirror device DG for green.

The blue image light L2 reflected at the digital micromirror device DB for blue is incident on the blue entrance/emission surface to be totally reflected at the entrance/emission surface of the blue prism PB and then is reflected at the blue dichroic surface. Meanwhile, the red image light L2 reflected at the digital micromirror device DR for red is incident on the red entrance/emission surface to be totally reflected by the air gap layer provided adjacent to the blue dichroic surface and then is reflected at the red dichroic surface to be further transmitted through the blue dichroic surface. Additionally, the green image light L2 reflected at the digital micromirror device DG for green enters the green entrance/emission surface and transmitted through the red dichroic surface and the blue dichroic surface.

Then, these respective red, blue, and green beams of the image light L2 are synthesized on the same optical axis AX and emitted from the entrance/emission surface of the blue prism PB to enter the first prism unit PU1. Since the image light L2 that has entered the first prism unit PU1 does not satisfy the total reflection condition in this case, the image light L2 is transmitted through the air gap AG (FIG. 3), and the image is cast onto the screen by the projection lens system PO.

In the projector PJ4, the light source device 1, the integral rod 3, the condenser lens system LN, and the first prism unit PU1 are provided for each of the RGB wavelength bands without using a prism for color separation. Therefore, as illustrated in FIG. 6 as an example, three first prism units PU1 each bend the light paths of the illumination light L1 divided into the RGB wavelength bands, to cause the illumination light L1 to enter three respective digital micromirror devices DR, DG, and DB. The light path is bent in such a manner that the illumination light L1 is incident on a slope of the prism P1 forming the air gap AG at an angle that satisfies the total reflection condition and is totally reflected.

The second prism unit PU2 equipped in the projector PJ4 is constituted by color prisms for color synthesis configured from three prisms PR, PG, and PB. For example, as illustrated in FIG. 6, three beams of the image light L2 reflected at the three respective digital micromirror devices DR, DG, and DB and transmitted through the first prism units PU1 to be emitted therefrom are synthesized and caused to enter the projection lens system PO. At this time, the image light L2 that has entered each of the three first prism units PU1 is transmitted through the air gap AG to be emitted from the first prism unit PU1, and enters the second prism unit PU2. Then, the image light L2 that has entered the projection lens system PO is projected onto the screen.

The color synthesis in the second prism unit PU2 will be described in more detail. FIG. 6 illustrates the first and second prism units PU1 and PU2 in a state viewed from a top side along the Y direction (FIG. 5). As illustrated in FIG. 6, the second prism unit PU2 has a structure in which substantially triangular prism-shaped blue prism PJ3 and red prism PR, and a block-shaped green prism PG are sequentially combined. In addition, as a micromirror device DP (FIG. 5) for modulating the illumination light L1 on the image display surface DS according to an image signal, a digital micromirror device DR for red, a digital micromirror device DG for green, and a digital micromirror device DB for blue are provided.

Between the blue prism PB and the red prism PR, a blue dichroic surface that reflects blue light and an air gap layer adjacent to the blue dichroic surface are provided. The air gap layer is inclined with respect to the optical axis AX. Between the red prism PR and the green prism PG, a red dichroic surface that reflects red light and an air gap layer adjacent to the red dichroic surface are provided. This air gap layer is also inclined with respect to the optical axis AX. The inclination direction thereof is opposite to the tilt direction of the air gap layer by the blue prism PB and the red prism PR.

The blue image light L2 reflected at the digital micromirror device DB for blue is transmitted through the first prism unit PU1 to be incident on a blue entrance surface and is totally reflected at an emission surface of the blue prism PB and then is reflected at the blue dichroic surface. Meanwhile, the red image light L2 reflected at the digital micromirror device DR for red is transmitted through the first prism unit PU1 to be incident on a red entrance surface and is totally reflected by the air gap layer provided adjacent to the blue dichroic surface; then the red image light L2 is reflected at the red dichroic surface to be further transmitted through the blue dichroic surface. Additionally, the green image light L2 reflected at the digital micromirror device DG for green is transmitted through the first prism unit PU1 to enter a green entrance surface and transmitted through the red dichroic surface and the blue dichroic surface.

Then, these respective red, blue, and green beams of the image light L2 are synthesized on the same optical axis AX to be emitted from the emission surface of the blue prism PB and enter the projection lens system PO so that an image is cast onto the screen by the projection leas system PO. Note that, since the image light L2 that has been reflected at each of the digital micromirror devices DR, DG, and DB and entered the first prism unit PU1 does not satisfy the total reflection condition, the image light L2 is transmitted through the air gap AG (FIG. 5).

The digital micromirror device DP including DR, DG, and DB is a reflection-type image display element for modulating light to generate an image, and has a structure provided with the image display surface DS that forms a two-dimensional image by modulating the intensity of the illumination light L1, a cover glass CG arranged thereon, and the like (FIGS. 1 to 3 and other drawings). For example, the image display surface DS is made up of a plurality of micromirrors; the tilt of each micromirror surface (pixel reflecting surface) is controlled to be turned ON/OFF on the image display surface DS and the intensity of the illumination light L1 is modulated, so that an image is formed. In other words, in the digital micromirror device DP, each micromirror surface is controlled to be turned ON/OFF on the image display surface DS made up of a plurality of rectangular micromirror surfaces, so that the micromirror is placed in two angle states, namely, an image display state (ON state) and an image non-display state (OFF state), whereby it is possible to modulate the intensity of the illumination light L1 to form a desired image.

A pixel of the digital micromirror device DP including DR, DG, and DB well known in the prior art has a rotation axis forming an angle of 45° with respect to each side of a rectangle-shaped image display region configured from the image display surface DS, and implements turning ON/OFF by revolving about that axis by, for example, ±12°. Then, only light reflected at a micromirror in the ON state is caused to pass through the projection lens system PO. On the other hand, in the case of digital micromirror device DP including DR, DG, and DB of a new operation type, the mirror surface is not revolved around one rotation axis but around two orthogonal rotation axes.

Figure 7:
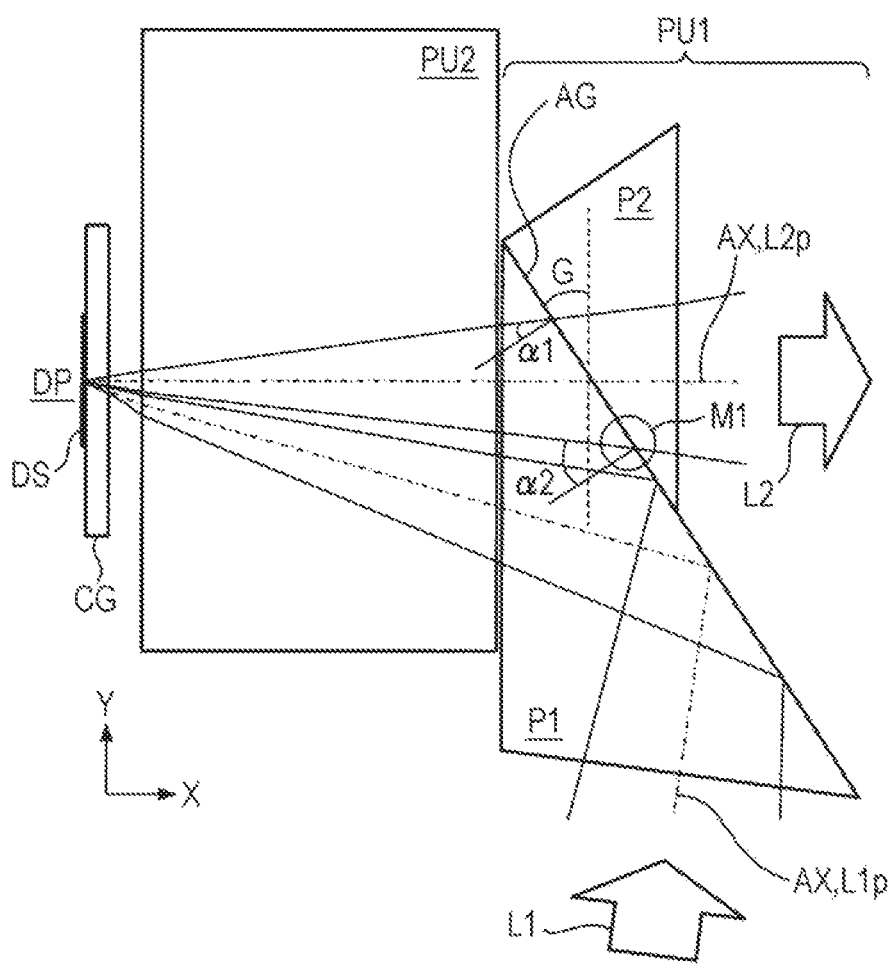
FIG. 7 is a light path diagram illustrating light path separation between illumination light and image light in the third embodiment.

FIG. 7 illustrates the light path of on-axis light flux of the image light L2 in the projector PJ3. When the illumination light L1 enters the prism P1, the light path is bent by total reflection at the air gap AG in the first prism unit PU1. The illumination light L1 is emitted from the prism Pit and travels through the second prism unit PU2 to irradiate the image display surface DS of the digital micromirror device DP. When the illumination light L1 irradiates the image display surface DS of the digital micromirror device DP, the image light L2 is emitted from the digital micromirror device DP by reflection on the illuminated image display surface DS. At this time, the main light ray L2$p$ of the image light L2 immediately after being reflected at the center of the image display surface DS forms a predetermined angle with respect to the main light ray L1$p$ of the illumination light L1 immediately before entering the center of the image display surface DS and the image light L2 is separated from the illumination light L1.

As illustrated in FIG. 7, the image light L2 travels through the second prism unit PU2 and is transmitted through the first prism unit PU1. At this time, the image light L2 is transmitted through the air gap AG disposed obliquely by the angle G with respect to a plane perpendicular to the optical axis AX, to be emitted from the second prism unit PU2 through the prism P2 and then enters the projection lens system PO to be projected onto the screen. Note that it is preferable that a lower end of the air gap AG be set below the lower limit position where the image light L2 is not blocked.

As described above, each of the projectors PJ1 to PJ4 is provided with: the digital micromirror device DP in which the illumination light L1 is reflected at the image display surface DS so as to be converted to the image light L2 and emitted; the first prism unit PU1 for bending the light path of the illumination light L1 and transmitting the image light L2; and the projection lens system PO for projecting the image light L2 transmitted through the first prism unit PU1 onto the screen. Then, as illustrated in FIG. 7, the first prism unit PU1 has the air gap AG disposed obliquely with respect to the main light ray L2$p$ of the image light L2 emitted from the center of the image display surface DS, and the image light L2 is transmitted through the air gap AG.

Figure 8:
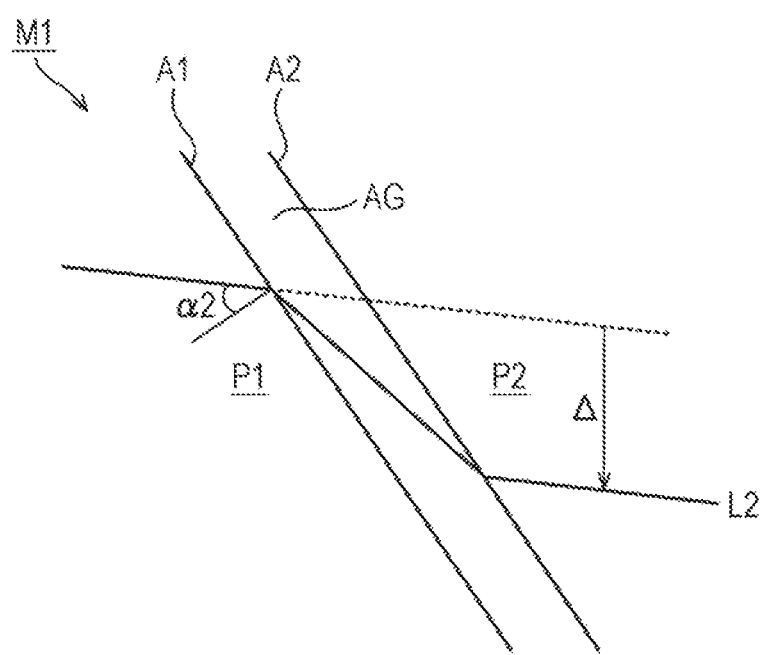
FIG. 8 is an enlarged light path diagram illustrating a principal part M1 in FIG. 7.

A light ray out of the image light L2 incident on the air gap AG at an incident angle α2 is greatly tilted with respect to the air gap AG ($\alpha 1 < \alpha 2$), so that it is greatly refracted at the air gap AG. An enlarged principal part M1 where the refraction occurs is illustrated in FIG. 8. The air gap AG is configured from prism surfaces A1 and A2 arranged so as to face each other, and the tilt rotation axis of the air gap AG is parallel to the Z direction. Then, as can be seen from FIG. 8, the light ray out of the image light L2 incident on the air gap AG at the incident angle $\alpha 2$ is greatly refracted at the air gap AG. A flare component $\Delta$ originated from this refraction is so-called comatic aberration and causes flare to be produced at the time of imaging by the projection lens system PO. Note that the direction of the flare component $\Delta$ is parallel to the screen surface, and the flare is evaluated as a distance on the screen surface.

In the projectors PJ1 to PJ4 including the above-described first prism unit PJ1, at least one lens in the projection lens system PO is eccentric in relation to the optical axis AX of the projection lens system PO so that the comatic aberration produced when the image light L2 is transmitted through the air gap AG will be canceled out. The lens which is eccentric is an eccentric lens DL (FIGS. 1 to 3, and 5). In the case of the projector PJ1 (FIG. 1), the lens eccentric in relation to the optical axis AX of the projection lens system PO is an eccentric lens DL which is eccentrically moved (for example, parallel eccentric) in a direction perpendicular to the optical axis AX of the projection lens system PO and the tilt rotation axis of the air gap AG (a direction parallel to the Y direction). In the case of the projector PJ2 (FIG. 2), the lens eccentric in relation to the optical axis AX of the projection lens system PO is an eccentric lens DL which is eccentrically rotated around an axis parallel to the tilt rotation axis of the air gap AG (parallel to the Z direction). The eccentric lenses DL in the projectors PJ3 and PJ4 are also the same as those err the projectors PJ1 and PJ2, and configured as an eccentric lens DL (FIGS. 3 and 5) in which at least one lens in the projection lens system PO is eccentrically moved or eccentrically rotated.

When at least one lens in the projection lens system PO is eccentric in relation to the optical axis AX of the projection lens system PO, comatic aberration due to the eccentricity is produced in the projection lens system PO. When the eccentric lens DL produces comatic aberration in a direction opposite to that of the comatic aberration produced by the image light L2 transmitted through the air gap AG, the production of flare is canceled out, so that flare in the cast image is eliminated and high image quality can be achieved. Moreover, since comatic aberration which cancels flare is produced instead of cutting flare, this flare correction has the advantage that the brightness does not decrease. Therefore, it is possible to attain high definition while maintaining brightness.

For a lens to be made eccentric, it is desirable that the sensitivity to phenomena other than comatic aberration be sufficiently lower than the sensitivity to comatic aberration. By making such a lens eccentric, comatic aberration can be corrected without producing other aberrations, and the image quality can be effectively improved. Generally, a lens having a relatively large light flux diameter with respect to the lens diameter has high sensitivity to comatic aberration. In addition, the movement eccentricity amount and the rotational eccentricity amount of the eccentric lens DL are proportional to the thickness and tilt amount of the air gap AG.

If the eccentric lens DL eccentrically moved in a direction perpendicular to the optical axis AX of the projection lens system PO and the tilt rotation axis of the air gap AG is used as a lens eccentric in relation to the optical axis AX of the projection lens system PO as in the projector PJ1 (FIG. 1), the production of flare when the image light L2 is transmitted through the air gap AG can be suppressed and the image quality can be easily and effectively improved. For example, if a holding frame of the lens is eccentrically moved in such a manner that the holding frame is pushed and pulled with a screw in a moving direction with respect to an outer cylinder of the projection lens system PO, the movement eccentricity can be easily adjusted. Furthermore, individual adjustment also can be made when the projection lens system PO is attached to the projection-type display device.

If the eccentric lens DL eccentrically rotated around an axis parallel to the tilt rotation axis of the air gap AG is used as a lens eccentric in relation to the optical axis AX of the projection lens system PO as in the projector PJ2 (FIG. 2), the production of flare when the image light L2 is transmitted through the air gap AG can be suppressed and the image quality can be easily and effectively improved. For example, if a holding frame of the lens is eccentrically rotated in such a manner that the holding frame is pushed and pulled with a screw in a rotation direction with respect to an outer cylinder of the projection lens system PO, the rotational eccentricity can be easily adjusted. Furthermore, individual adjustment also can be made when the projection lens system PO is attached to the projection-type display device.

The three-chip-type projector PJ3 is provided with the digital micromirror devices DR, DG, and DB (FIG. 4) provided for each of a plurality of wavelength bands RGB and includes, as a prism unit, the first prism unit PU1 that bends the light path of the illumination light L1 containing the plurality of wavelength bands RGB by reflection at a prism surface A1 constituting the air gap AG; and the second prism unit PU2 (color prism for color separation and synthesis) that separates the illumination light L1 that has been bent at the first prism unit PU1 and emitted therefrom into the plurality of wavelength bands RGB to cause the separated beams of the illumination light L1 to enter the plurality of respective digital micromirror devices DR, DG, and DB, and synthesizes beams of the image light L2 emitted from the respective digital micromirror devices DR, DG, and DB to cause the synthesized image light L2 to enter the first prism unit PU1. Then, the air gap AG included in the first prism unit PU1 is disposed obliquely with respect to the main light ray L2$p$ of the image light L2 emitted from the center of the image display surface DS, and is configured in such a manner that the image light L2 that has entered the first prism unit PU1 is transmitted through the air gap AG and emitted from the first prism unit PU1 to enter the projection lens system PO.

As described earlier, the production of flare at the air gap AG is canceled out as a result by at least one eccentric lens DL. Therefore, according to the projector PJ3, the image quality is improved and high definition can be attained while the brightness is maintained. In the three-chip-type projection-type display device, since higher luminance is required, it is necessary to set the air gap AG comparatively widely so as to cope with a large temperature change. The flare to be produced becomes correspondingly larger, so that the above effect also becomes larger.

The three-chip-type projector PJ4 is provided with the digital micromirror devices DR, DG, and DB (FIG. 6) provided for each of a plurality of wavelength bands RGB and includes, as a prism unit, the plurality of first prism units PU1 that bends respective light paths of a plurality of beams of the illumination light L1 divided into the plurality of wavelength bands RGB, and causes the beams of the illumination light L1 to enter the plurality of respective digital micromirror devices DR, DG, and DB; and the second prism unit PU2 (color prism for color synthesis) that synthesizes a plurality of beams of the image light L2 that has been reflected at the plurality of respective digital micromirror devices DR, DG, and DB and transmitted through the first prism units PU1 to be emitted therefrom, and causes the synthesized image light L2 to enter the projection lens system PO. Then, the plurality of first prism units PU1 each has the air gap AG disposed obliquely with respect to the main light ray L2p of the image light L2 emitted from the center of the image display surface DS, and is configured in such a manner that respective beams of the image light L2 that have entered the plurality of first prism units PU1 are transmitted through the air gaps AG and emitted from the first prism units PU1 to enter the second prism unit PU2.

As described earlier, the production of flare at the air gap AG is canceled out as a result by at least one eccentric lens DL. Therefore, according to the projector PJ4, the image quality is improved and high definition can be attained while the brightness is maintained. In the three-chip-type projection-type display device, since higher luminance is required, it is necessary to set the air gap AG comparatively widely so as to cope with a large temperature change. The flare to be produced becomes correspondingly larger, so that the above effect also becomes larger.

As can be understood from the above description, each of the above-described embodiments and examples described later include the following characteristic configurations (#1) to (#5) and the like.

(#1): a projection-type display device including: a reflection-type image display element, in which illumination light is reflected at an image display surface so as to be converted to image light and emitted; a prism unit that bends a light path of the illumination light and transmits image light; and a projection lens system that projects the image light transmitted through the prism unit onto a screen, in which
 the prism unit has an air gap that is disposed obliquely with respect to a main light ray of the image light emitted from a center of the image display surface, and at least one lens in the projection lens system is eccentric in relation to an optical axis of the projection lens system so that comatic aberration produced when the image light is transmitted through the air gap will be canceled out.

(#2): the projection-type display device according to (#1), in which a lens eccentric in relation to the optical axis of the projection lens system is an eccentric lens eccentrically moved in a direction perpendicular to the optical axis of the projection lens system and a tilt rotation axis of the air gap.

(#3): the projection-type display device according to (#1), in which a lens eccentric in relation to the optical axis of the projection lens system is an eccentric lens eccentrically rotated around an axis parallel to a tilt rotation axis of the air gap.

(#4): the projection-type display device according to any one of (#1) to (#3), in which
 the image display element is provided for each of a plurality of wavelength bands, and
 the prism unit includes: a first prism unit that bends a light path of illumination light containing the plurality of wavelength bands by reflection at a prism surface constituting the air gap; and a second prism unit that separates the illumination light that has been bent at the first prism unit and emitted from the first prism unit into the plurality of wavelength bands to cause the separated beams of the illumination light to enter a plurality of the respective image display elements, and synthesizes beams of image light emitted from the respective image display elements to cause the synthesized image light to enter the first prism unit.

(#5): the projection-type display device according to any one of (#1) to (#3), in which
 the image display element is provided for each of a plurality of wavelength bands, and
 the prism unit includes: a plurality of first prism units that bends light paths of a plurality of beams of illumination light divided into the plurality of wavelength bands by reflection at a prism surface constituting the air gap, and causes the beams of the illumination light to enter a plurality of the respective image display elements; and a second prism unit that synthesizes a plurality of beams of image light that has been reflected at the plurality of the respective image display elements and transmitted through the first prism units to be emitted from the first prism units, and causes the synthesized image light to enter the projection lens system.

EXAMPLES

Hereinafter, the configuration and the like of the projection-type display device in which the present invention is carried out will be described more specifically with reference to the construction data and the like of examples. The examples given here are numerical examples corresponding to the projector PJ3 of the third embodiment described above, and the light path diagram thereof is illustrated in FIG. 9.

Table 1 illustrates focal length (mm), lens back (mm), F number, image height (mm) and half angle of view ($\omega$, °) as various types of data of the examples. Table 2 illustrates the construction data of the examples. In order from the left column, the construction data indicates, as surface data, lens Gi (i=1, 2, 3, . . . in order from the magnification side) and the like, radius of curvature (mm), on-axis surface spacing (mm), refractive index nd with regard to d line (wavelength: 587.56 nm), Abbe number Vd with regard to d line, effective radius (mm), and rotation angle (°).

FIGS. 10 to 13 illustrate optical performances before and after comatic aberration correction in the examples. Here, a lens G18 (eccentricity amount: −0.8 mm) is taken as the eccentrically moved eccentric lens DL, whereas a lens G18 (eccentricity amount: −0.2 deg) and a lens G9 (eccentricity amount: −0.1 deg) are taken as the eccentrically rotated eccentric lens DL. For the eccentric direction, the downward direction in the Y direction in FIG. 3 and other drawings is regarded as the negative direction and the clockwise direction around an axis parallel to the Z direction in FIG. 3 and other drawings is regarded as the negative direction. In the case of the eccentrically rotated eccentric lens DL, the central axis of rotational eccentricity (an axis parallel to the tilt rotation axis of the air gap AG) of the lenses G18 and G9 is located at the vertex of a magnification side lens surface, and its rotation direction is opposite to the tilt rotation direction of the air gap AG. Note that the examples adopt a reduction system in terms of the optical design and, assuming that the screen surface is an object surface, the optical performance is evaluated on the image display surface (reduction side image surface) DS corresponding to the image surface.

Figure 10A:
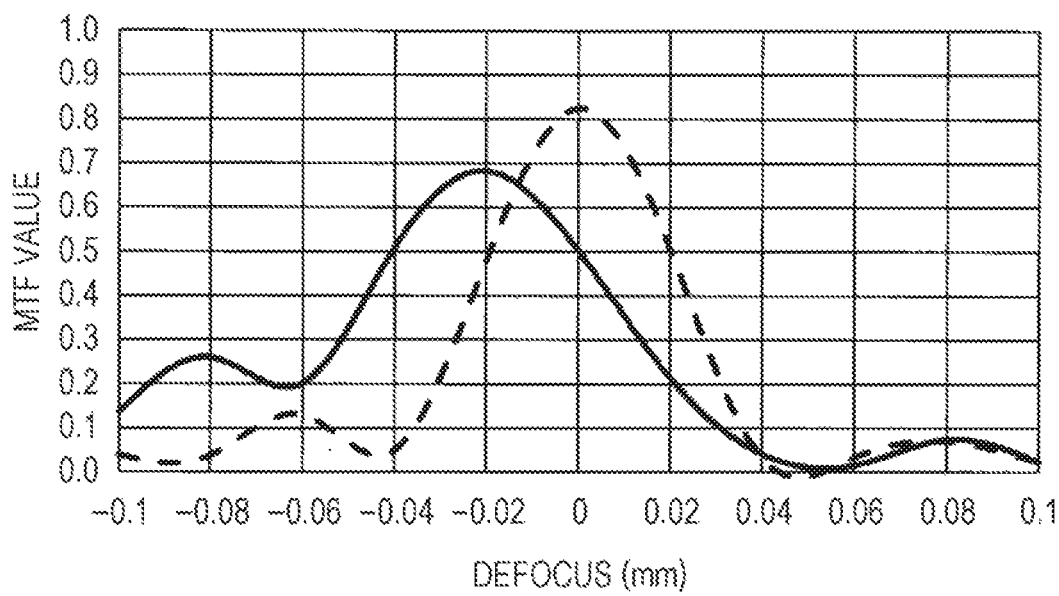
FIG. 10 is a graph illustrating a modulation transfer function (MTF) before and after correction of comatic aberration (lens movement eccentricity) in the examples.
Figure 10B:
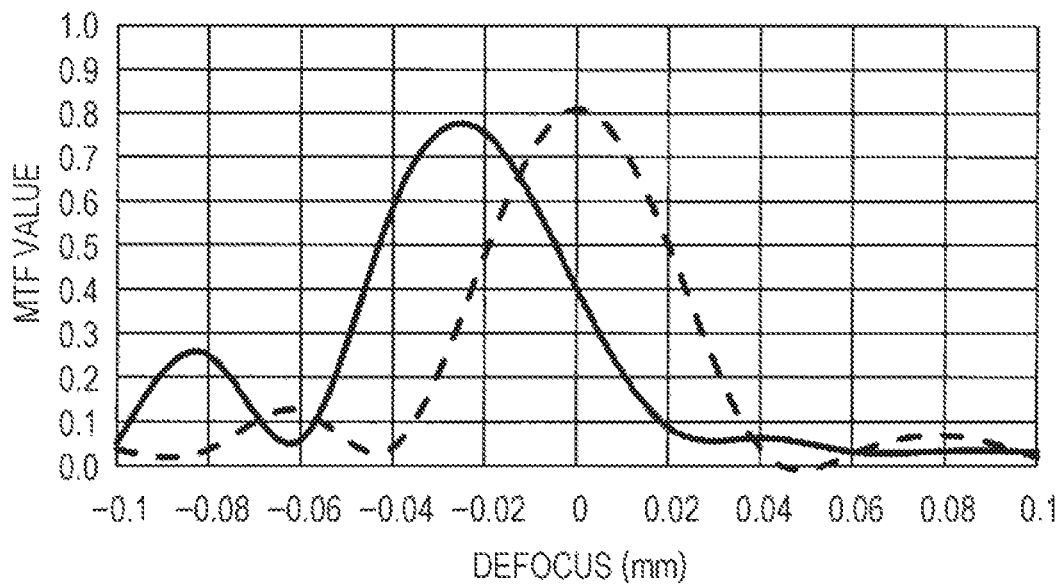
Figure 11A:
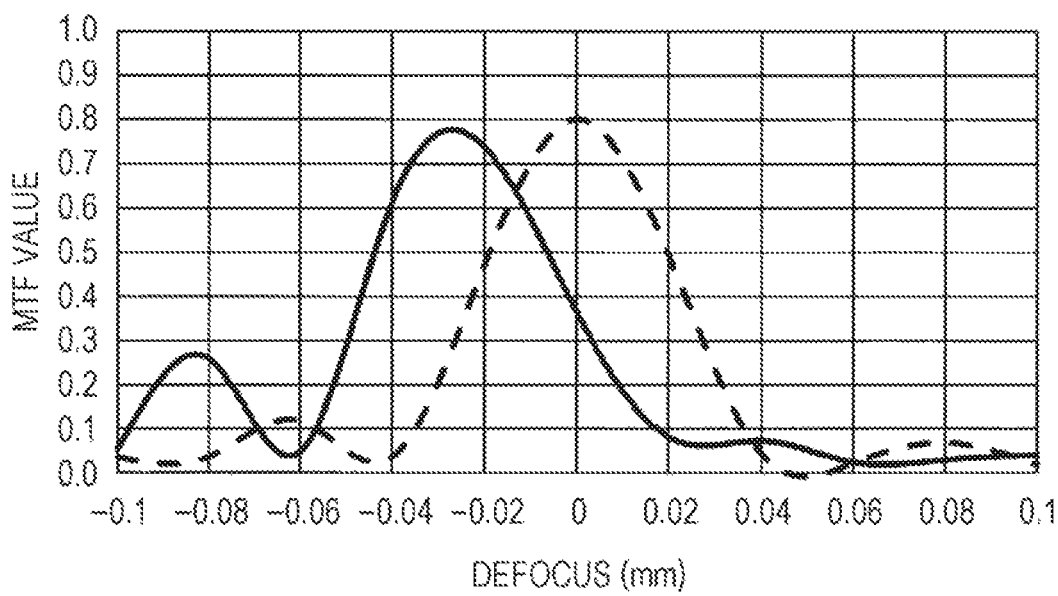
FIG. 11 is a graph illustrating the MTF after correction of comatic aberration (lens rotational eccentricity) in the examples.
Figure 11B:
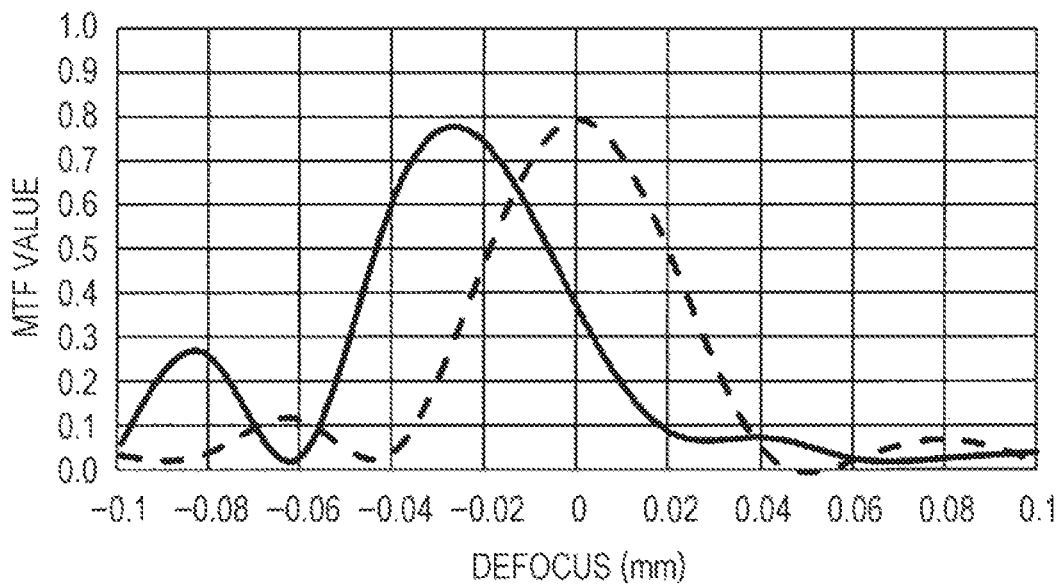

FIGS. 10 and 11 are graphs illustrating changes in modulation transfer function (MTF) by defocus (mm) (solid lines: MTF values in the XY plane (tangential plane) direction, broken lines: MTF values in the XZ plane (sagittal plane) direction, spatial frequency: 90 cycles/mm, wavelength: 550 nm). FIG. 10A illustrates the MTF (the evaluated image height is on the axis (image height=0)) when no eccentricity is applied, FIG. 10B illustrates the MTF when the lens G18 is eccentrically moved (eccentricity amount: −0.8 mm), FIG. 11A illustrates the MTF when the lens G18 is eccentrically rotated (eccentricity amount: −0.2 deg), and FIG. 11B illustrates the MTF when the lens G9 is eccentrically rotated (eccentricity amount: −0.1 deg).

Figure 12A:
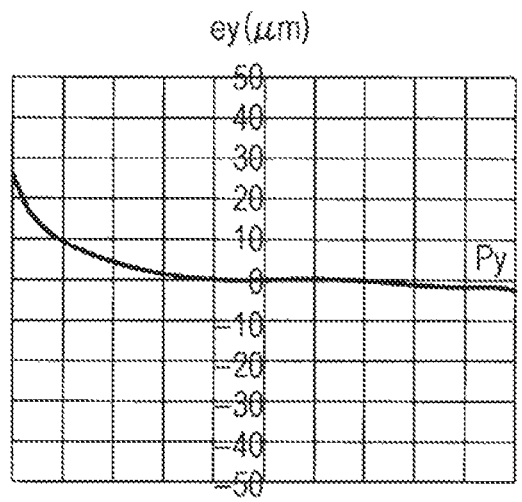
FIG. 12 is a graph illustrating transverse aberration before and after correction of comatic aberration (lens movement eccentricity) in the examples.
Figure 12B:
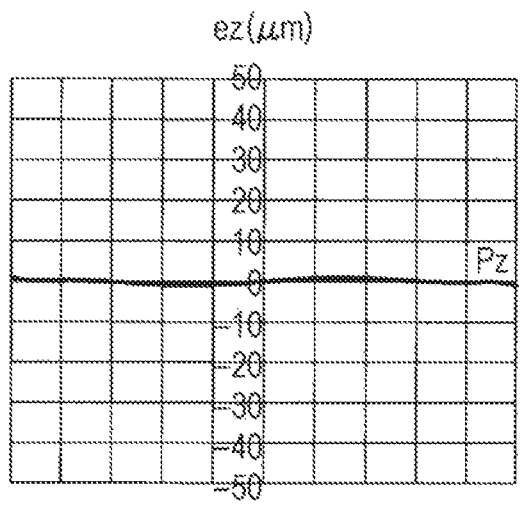
Figure 12C:
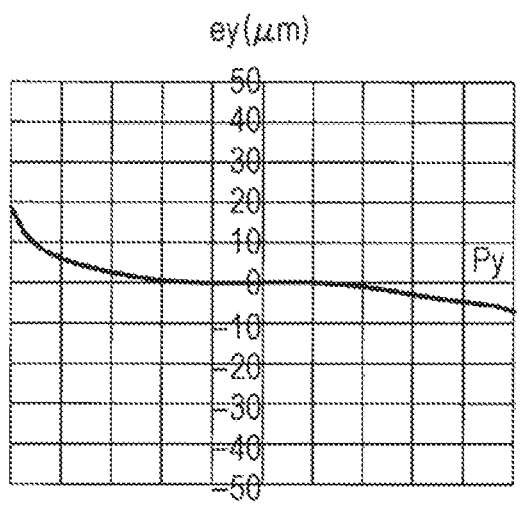
Figure 12D:
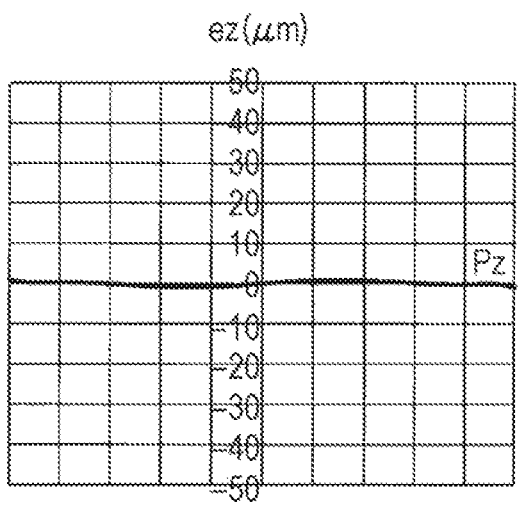
Figure 13A:
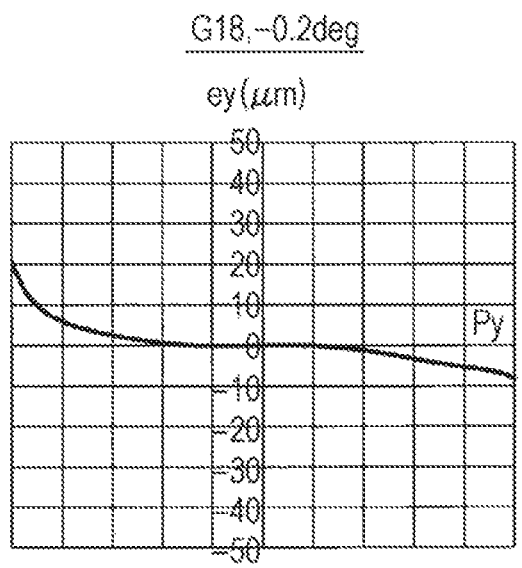
FIG. 13 is a graph illustrating transverse aberration after correction of comatic aberration (lens rotational eccentricity) in the examples.
Figure 13B:
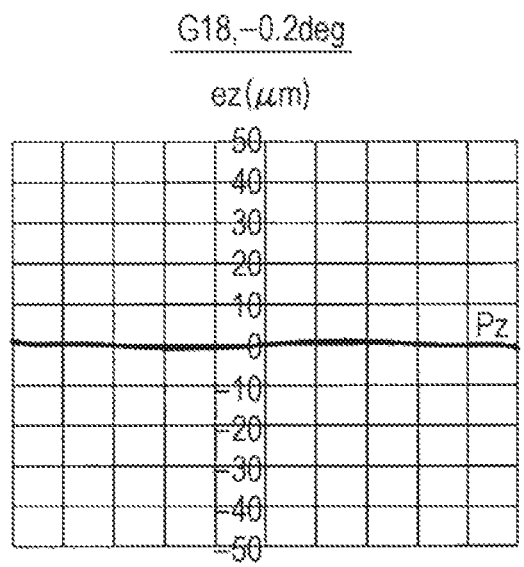
Figure 13C:
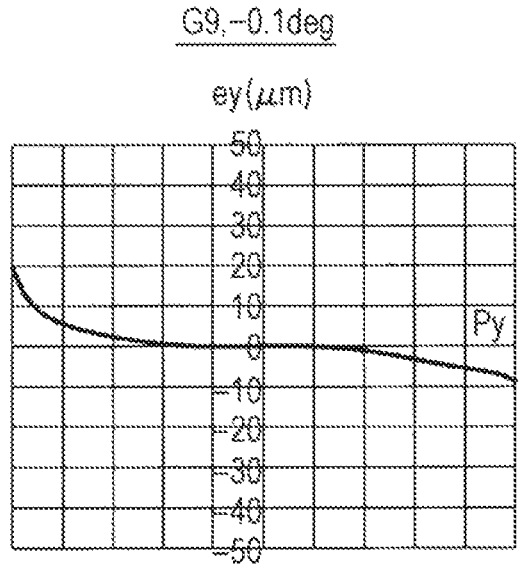
Figure 13D:
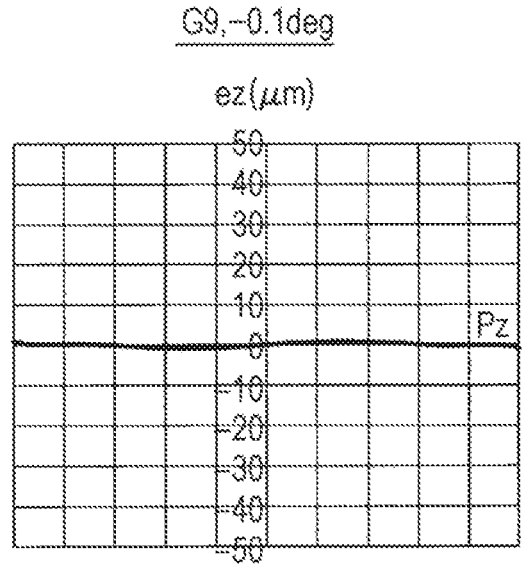

FIGS. 12 and 13 are graphs illustrating transverse aberration, where FIGS. 12A and 12C and FIGS. 13A and 13C illustrate transverse aberration ey (μm) in the XY plane (tangential plane) direction (Py: entrance pupil coordinates), and FIGS. 12B and 12D and FIGS. 13B and 13D illustrate transverse aberration ez (μm) in the XZ plane (sagittal plane) direction (Pz: entrance pupil coordinates). FIGS. 12A and 12B illustrate transverse aberration (the evaluated image height is on the axis (image height=0)) when no eccentricity is applied, FIGS. 12C and 12D illustrate transverse aberration when the lens G18 is eccentrically moved (eccentricity amount: −0.8 mm), FIGS. 13A and 13B illustrate transverse aberration when the lens G18 is eccentrically rotated (eccentricity amount: −0.2 deg), and FIGS. 13C and 13D illustrate transverse aberration when the lens G9 is eccentrically rotated (eccentricity amount: −0.1 deg).

With the eccentric lenses DL as described above, in each of the projectors PJ1 to PJ4, comatic aberration attributable to the image light L2 transmitted through the air gap AG can be effectively canceled out, and image quality can be improved by reducing the flare due to the comatic aberration. Furthermore, since canceling out comatic aberration is completed only with at least one lens in the projection leas system PO, there is also the advantage that there is no need to modify other parts. Note that either one of the eccentrically moved lens and the eccentrically rotated lens may be used as the eccentric lens DL, or both of them may be used in combination; alternatively a combined plurality of eccentrically moved lenses and eccentrically rotated lenses may be used.

TABLE 1

| Focal Length (mm) | 40.0 |
|---|---|
| Lens Back (mm) | 0.519 |
| F Number | 2.5 |
| Image Height (mm) | 15.0 |
| Half Angle of View (ω, °) | 21.2 |

TABLE 2

| | Radius of Curvature (mm) | On-Axis Surface Spacing (mm) | Nd | Vd | Effective Radius (mm) | Rotation Angle (°) |
|---|---|---|---|---|---|---|
| G1 | 200.548 | 8.998 | 1.51680 | 64.2 | 40.0 | 0 |
| | −339.167 | 0.440 | | | 40.0 | 0 |
| G2 | 144.309 | 4.397 | 1.58913 | 61.3 | 35.0 | 0 |
| | 63.164 | 9.887 | | | 30.0 | 0 |
| G3 | 338.864 | 3.517 | 1.49700 | 81.6 | 30.0 | 0 |
| | 83.834 | 13.026 | | | 28.0 | 0 |
| G4 | −71.547 | 3.517 | 1.67270 | 32.2 | 25.0 | 0 |
| | 217.426 | 13.262 | | | 26.0 | 0 |
| G5 | 320.664 | 8.512 | 1.51680 | 64.2 | 26.0 | 0 |
| | −84.918 | 33.543 | | | 26.0 | 0 |
| G6 | −465.975 | 6.155 | 1.72342 | 38.0 | 23.0 | 0 |
| | −124.991 | 0.440 | | | 23.0 | 0 |
| G7 | 70.810 | 7.314 | 1.63854 | 55.4 | 22.0 | 0 |
| | ∞ | 4.246 | | | 22.0 | 0 |
| G8 | −111.617 | 2.638 | 1.49700 | 81.6 | 20.0 | 0 |
| | 72.389 | 4.070 | | | 19.0 | 0 |

TABLE 2-continued

| | Radius of Curvature (mm) | On-Axis Surface Spacing (mm) | Nd | Vd | Effective Radius (mm) | Rotation Angle (°) |
|---|---|---|---|---|---|---|
| G9 | 197.279 | 2.198 | 1.49700 | 81.6 | 18.0 | 0 |
| | 56.031 | 6.964 | | | 18.0 | 0 |
| G10 | −66.585 | 2.198 | 1.49700 | 81.6 | 18.0 | 0 |
| | 4279.727 | 22.746 | | | 18.0 | 0 |
| G11 | 234.753 | 6.155 | 1.68893 | 31.2 | 20.0 | 0 |
| | −113.689 | 0.440 | | | 20.0 | 0 |
| ST | ∞ | 51.874 | | | 18.616 | 0 |
| G12 | −225.015 | 7.195 | 1.49700 | 81.6 | 24.0 | 0 |
| | −45.823 | 3.230 | | | 24.0 | 0 |
| G13 | −42.827 | 2.638 | 1.78590 | 43.9 | 25.0 | 0 |
| | ∞ | 0.925 | | | 28.0 | 0 |
| G14 | 249.857 | 8.839 | 1.49700 | 81.6 | 29.0 | 0 |
| | −68.630 | 0.440 | | | 29.0 | 0 |
| G15 | 130.099 | 8.062 | 1.49700 | 81.6 | 30.0 | 0 |
| | −137.475 | 21.003 | | | 30.0 | 0 |
| G16 | −1674.608 | 3.517 | 1.78590 | 43.9 | 30.0 | 0 |
| | 63.477 | 3.208 | | | 28.0 | 0 |
| G17 | 72.886 | 9.565 | 1.49700 | 81.6 | 29.0 | 0 |
| | −186.634 | 3.480 | | | 29.0 | 0 |
| G18 | 138.054 | 5.116 | 1.49700 | 81.6 | 29.0 | 0 |
| | ∞ | 0.440 | | | 29.0 | 0 |
| G19 | 152.648 | 4.779 | 1.49700 | 81.6 | 29.0 | 0 |
| | ∞ | 9.552 | | | 29.0 | 0 |
| PU1(P2) | ∞ | 17.000 | 1.51680 | 64.2 | 40.0 | 0 |
| | ∞ | (AG) 0.010 | | | 40.0 | 33.0 |
| PU1(P1) | ∞ | 17.000 | 1.51680 | 64.2 | 40.0 | 33.0 |
| | ∞ | 1.000 | | | 40.0 | 0 |
| PU2 | ∞ | 71.000 | 1.51680 | 64.2 | 40.0 | 0.0 |
| | ∞ | 4.397 | | | 40.0 | 0 |
| CG | ∞ | 2.638 | 1.50847 | 61.2 | 20.0 | 0 |
| | ∞ | | | | 20.0 | 0 |

REFERENCE SIGNS LIST

PJ1, PJ2, PJ3, PJ4 Projector (projection-type display device)
IL Illumination optical system
LN Condenser lens system
PU1 First prism unit
PU2 Second prism unit
PR Red prism
PG Green prism
PB Blue prism
P1, P2 Prism
A1, A2 Prism surface
AG Air gap
DP Digital micromirror device (reflection-type image display element)
DR Digital micromirror device for red (reflection-type image display element)
DG Digital micromirror device for green (reflection-type image display element)
DB Digital micromirror device for blue (reflection-type image display element)
DS Image display surface
L1 Illumination light
L2 Image light
L1p, L2p Central main light ray
PO Projection lens system
DL Eccentric lens
AX Optical axis

The invention claimed is:
1. A projection-type display device comprising: a reflection-type image display element, in which illumination light is reflected at an image display surface so as to be converted to image light and emitted; a prism unit that bends a light path of the illumination light and transmits image light and a projection lens system that projects the image light transmitted through the prism unit onto a screen, wherein the prism unit has an air gap that is disposed obliquely with respect to a main light ray of the image light emitted from a center of the image display surface, and at least one lens in the projection lens system is eccentric in relation to an optical axis of the projection lens system so that comatic aberration produced when the image light is transmitted through the air gap will be canceled out, and a lens eccentric in relation to the optical axis of the projection lens system is an eccentric lens eccentrically moved in a direction perpendicular to the optical axis of the projection lens system and a tilt rotation axis of the air gap.

2. The projection-type display device according to claim 1, wherein the image display element is provided for each of a plurality of wavelength bands, and the prism unit includes: a first prism unit that bends a light path of illumination light containing the plurality of wavelength bands by reflection at a prism surface constituting the air gap; and a second prism unit that separates the illumination light that has been bent at the first prism unit and emitted from the first prism unit into the plurality of wavelength bands to cause the separated beams of the illumination light to enter a plurality of the respective image display elements, and synthesizes beams of image light emitted from the respective image display elements to cause the synthesized image light to enter the first prism unit.

3. The projection-type display device according to claim 1, wherein the image display element is provided for each of a plurality of wavelength bands, and the prism unit includes: a plurality of first prism units that bends light paths of a plurality of beams of illumination light divided into the plurality of wavelength bands by reflection at a prism surface constituting the air gap, and causes the beams of the illumination light to enter a plurality of the respective image display elements; and a second prism unit that synthesizes a plurality of beams of image light that has been reflected at the plurality of the respective image display elements and transmitted through the first prism units to be emitted from the first prism units, and causes the synthesized image light to enter the projection lens system.

4. A projection-type display device comprising: a reflection-type image display element, in which illumination light is reflected at an image display surface so as to be converted to image light and emitted; a prism unit that bends a light path of the illumination light and transmits image light and a projection lens system that projects the image light transmitted through the prism unit onto a screen, wherein the prism unit has an air gap that is disposed obliquely with respect to a main light ray of the image light emitted from a center of the image display surface, and at least one lens in the projection lens system is eccentric in relation to an optical axis of the projection lens system so that comatic aberration produced when the image light is transmitted through the air gap will be canceled out, and a lens eccentric in relation to the optical axis of the projection lens system is an eccentric lens eccentrically rotated around an axis parallel to a tilt rotation axis of the air gap.

5. The projection-type display device according to claim 4, wherein the image display element is provided for each of a plurality of wavelength bands, and the prism unit includes: a first prism unit that bends a light path of illumination light containing the plurality of wavelength bands by reflection at a prism surface constituting the air gap; and a second prism unit that separates the illumination light that has been bent at the first prism unit and emitted from the first prism unit into the plurality of wavelength bands to cause the separated beams of the illumination light to enter a plurality of the respective image display elements, and synthesizes beams of image light emitted from the respective image display elements to cause the synthesized image light to enter the first prism unit.

6. The projection-type display device according to claim 4, wherein the image display element is provided for each of a plurality of wavelength bands, and the prism unit includes: a plurality of first prism units that bends light paths of a plurality of beams of illumination light divided into the plurality of wavelength bands by reflection at a prism surface constituting the air gap, and causes the beams of the illumination light to enter a plurality of the respective image display elements; and a second prism unit that synthesizes a plurality of beams of image light that has been reflected at the plurality of the respective image display elements and transmitted through the first prism units to be emitted from the first prism units, and causes the synthesized image light to enter the projection lens system.

* * * * *